United States Patent [19]
Porter

[11] 3,874,557
[45] Apr. 1, 1975

[54] SELF-COOLING OR SELF-HEATING BEVERAGE CONTAINER OR THE LIKE

[76] Inventor: Harold E. Porter, 987 S. Newark St., Aurora, Colo. 80012

[22] Filed: Feb. 7, 1974

[21] Appl. No.: 440,461

[52] U.S. Cl............ 222/80, 222/146 H, 222/146 C
[51] Int. Cl.............................................. B67b 7/24
[58] Field of Search........... 222/563, 146 H, 146 C, 222/80, 541; 62/457, 383

[56] References Cited
UNITED STATES PATENTS

| | | | |
|---|---|---|---|
| 2,757,517 | 8/1956 | Goldberg | 62/457 X |
| 2,773,358 | 12/1956 | Palmer et al. | 62/457 X |
| 3,039,644 | 6/1962 | Lefcort | 222/80 X |
| 3,229,478 | 1/1966 | Alonso | 222/146 C X |
| 3,422,992 | 1/1969 | Brooks et al. | 222/80 |
| 3,726,106 | 4/1973 | Jaeger | 62/457 X |

*Primary Examiner*—Stanley H. Tollberg
*Assistant Examiner*—Norman L. Stack, Jr.
*Attorney, Agent, or Firm*—Richard D. Law

[57] ABSTRACT

A self-cooling or self-heating comestible container includes an enclosed, rigid, outer shell having a sealed beverage portion within the shell and the remaining portion of the internal cavity of the shell containing a two-part separated thermal system. The comestible, which may be a beverage, is separated from the thermal, for a beverage it is generally a coolant, system by means of a flexible diaphragm or membrane to prevent contamination of the comestible. A removable closure can be provided in the shell for the dispensing of the comestible or beverage when desired. In a cooling system, the refrigerant system is composed of two ingredients, such as ammonium nitrate and water, stored separately within the container shell. A rupturing device which includes a rotatable knife is provided to cut the barrier between the two ingredients so as to permit the mixing of the ingredients to provide the thermal effect, and specifically chilling of the beverage. A separate key-like tool can be provided for actuating the rupturing thermal containing device.

11 Claims, 4 Drawing Figures

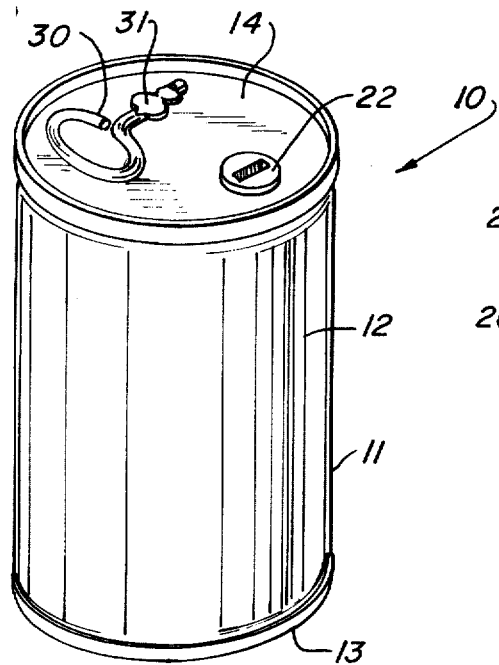
Fig_1
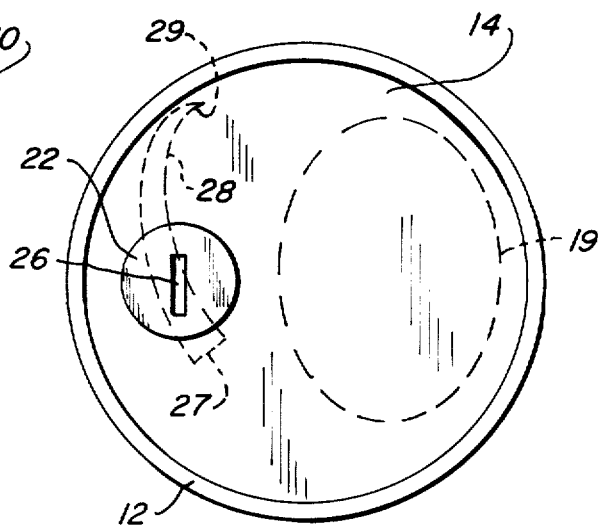
Fig_3
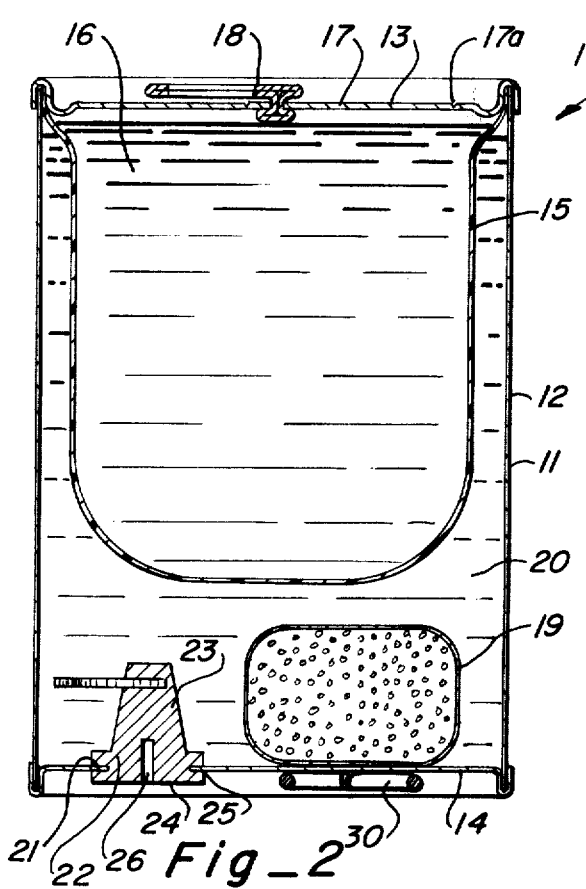
Fig_2
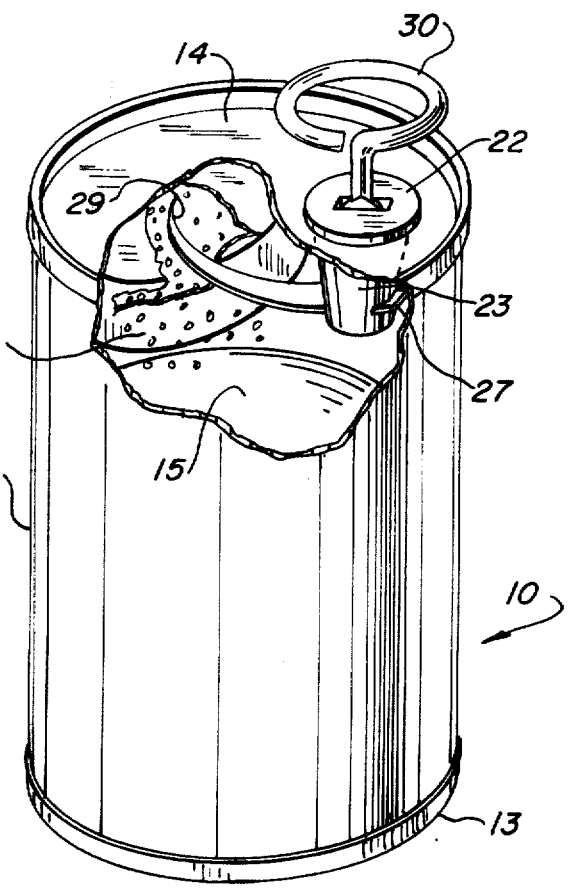
Fig_4

SELF-COOLING OR SELF-HEATING BEVERAGE CONTAINER OR THE LIKE

This invention relates generally to self-contained food and beverage containers for heating or cooling, and in a specific embodiment to a self-contained, self-cooling container for beverages.

Self-cooling beverage cans have been rather well known in the prior art. In most of these devices, however, a low boiling point liquid which, on release, turns to a vapor phase, refrigerates directly the beverage contained internally within the container. In some cases, the refrigerant mixes with the beverage and is consumed by the user which necessitates the use of a palatable refrigerant. In some devices, two ingredients are used, but the methods of storing and mixing the ingredients are cumbersome and sometimes inefficient.

Various container configurations have also been suggested in the prior art, such as where a rigid dividing wall is provided between the coolant and the beverage. These containers provide an inner-face wall in various configurations in an attempt to increase the efficiency of the cooling process for the beverage.

It is an object of the present invention to provide a self-contained comestible container which includes a comestible and a thermal system separated from the comestible by means of a flexible diaphragm or membrane to prevent contamination of the comestible.

It is a further object of the present invention to provide a self-cooling beverage container wherein an inexpensive, two-part coolant system is contained in separate fashion so that complete mixing of the cooling system ingredients, when desired, will initiate the cooling process.

It is a still further object of the present invention to provide a self-cooling beverage container wherein the coolant system ingredients are separated from each other and are mixed by the actuation of a simple rupturing device which is included with the can, eliminating the need for additional separate tools to actuate the cooling process.

A still further object of the present invention is to provide a self-contained comestible container which is both simple and economical to manufacture and yet prevents contamination of the comestible during the heating or cooling process.

The comestible container of the invention includes an exterior shell of substantially rigid material. The comestible is contained in at least a partially flexible container inside the exterior shell. In one form, the flexible container is a cup-shaped member sealed around its open end at one end of the exterior shell. In the remaining portion of the interior of the container, a container seals the materials for an exothermic or endothermic reaction for heating or cooling the comestible. Any ingredients which provide the desired heating or cooling result can be used in the present invention, such as a dissolvable salt and solvent, including ammonium nitrate and water for cooling, have been found to be satisfactory. One of the ingredients is contained within an imperforate, flexible, rupturable pouch which can be similar to the ordinary balloon, with the second ingredient surrounding the rupturable pouch and fill the remaining volume of the outer shell. A rupturing device, such as a rotatable, hooked knife, is positioned through a wall of the container and is positioned so that the knife is spaced from the rupturable pouch enclosing the first ingredient to prevent accidental initiation of the cooling process. Means, fastened to one end of the container, can be provided as a rupturing device so that a knife can be rotatably moved to penetrate the pouch of the first ingredient to allow the complete mixing of the ingredients.

The mixing of the ingredients permits dissolving the salt in the solvent, e.g., ammonium nitrate salt in the water, to produce the desired thermal effect, heating or cooling. Since the solution substantially surrounds and contacts the separating membrane for the comestible, a substantial heat transfer through the separating membrane is obtained.

The outside can or shell of the present invention may be made from any type of common suitable materials, such as metal or plastic, while the membrane and flexible pouch for the comestible and cooling or heating ingredients can be formed from any type of materials, such as rubber or preferably synthetic plastics. It is desirable that the membrane material have a non-aging characteristic so that the device will be storable without contamination of the comestible over an extended period of time. Also, the membrane must not contaminate the taste of the comestible; thus, it cannot impart any foreign taste or odor to the beverage.

Other objects of this invention will appear in the following description and appended claims, reference being made to the accompanying drawings forming a part of the specification, while like reference characters designate corresponding parts in the several views.

FIG. 1 is a perspective view showing the self-cooling beverage can of the present invention in the inverted position;

FIG. 2 is a sectional view of the can according to this invention, in the upright position showing the relative position of the various components;

FIG. 3 is a bottom view of the can according to the present invention; and

FIG. 4 is a perspective view showing a cut-away section of the rupturing device as provided in the self-cooling beverage can.

Turning now more specifically to FIGS. 1 and 2, a self-cooling beverage container 10, specifically to illustrate one form of the present invention, includes an outer, enclosed shell 11 having a side wall 12 and opposed end walls 13, 14. The shell 11 can have the outer configuration of a common beverage can, as illustrated, if desired. The end walls 13, 14 are sealed around their outer edges to the side wall 12 in any suitable manner, such as by crimping or rolling, to form a liquid tight seal. A sack-like membrane or diaphragm 15 forming the beverage receptacle, which is sized to accommodate a desired volume of the internal volume of the shell 11, is sealed around its outer edges at the juncture of the side walls 12 and end wall 13. If desired, the edges of the membrane 15 can be secured in the joint between the side wall and the end wall during the rolling process, or can be sealed in the area of the junction by means of an adhesive. It is desirable that the outer diameter of the body of the membrane 15 be slightly smaller than the inside diameter of the side wall 12 so that a space will be present between the membrane and side wall to permit the coolant liquid to circulate around the outer surface of the membrane 15 to permit maximum, efficient cooling.

The inner portion of the receptacle membrane 15 is sealed to contain a consumable beverage within the receptacle cavity 16 formed by the membrane 15 and the end wall 13. A tearable opening 17 can be provided in the end wall 13 which is defined by a continuously scored line 17a and connected to a handle 18 as is commonly used on present day beverage cans. It is also possible to make end wall 13 of continuous material and use a V-shaped cutting opener to pierce the end wall 13 for opening the cavity 16, as is also well known.

A pouch 19, formed from a flexible, frangible material and which is completely sealed to contain one of the refrigerant ingredients, is internally attached to either the end wall 14 or the side wall 12 to hold it in position along one end of the shell opposite from the beverage receptacle cavity 16. The second refrigerant ingredient is arranged to completely fill the cavity 20 formed by the side wall 12, membrane 15 and end wall 14. It may be desirable to eliminate any air space within the cavity 20 so that there can be little relative movement between the membrane 15 and the pouch 19 during the storage or handling of the receptacle, depending on the comestible and thermal effect materials.

An opening 21 is provided in the end wall 14, substantially diagonally opposite the pouch 19. A plug 22, having a body 23 and flange 24 formed at one end, is inserted in the opening 21 to seal the opening, yet permit rotational movement. A circumferential groove 25 is provided in the flange 24 and is sized to fit the thickness of the end wall 14 and seal the opening 21. A slot 26 can be provided in the outer surface of the flange 24 to facilitate rotational movement of the plug 22. A curved rupturing knife 27, having one end embedded in the plug body 23, is arranged to depend outwardly from the longitudinal axis of the plug 22 in position to rupture the pouch. This may be perpendicular to the axis or at a convenient angle. The knife may include an outer, curved portion 28 extending away from the plug 22 and may end in a sharpened point 29 or blunt end as desired. A sharpened edge 28a can be provided along the inside edge of the curved portion 28. The curved portion 28 of the knife 27 can be arranged to substantially follow the inside contour of the side wall 12 so that the point 29 can be positioned substantially adjacent to and in contact with the inside surface of the shell 11 to prevent accidental contact with the pouch 19. A key 30, having one end conventionally attached to the outside surface of end wall 14 and having a wide end 31, can be provided on the receptacle so that it can be broken loose and the wide end 31 of the key 30 inserted in the slot 26 for rotating the plug 22 and knife 27. If desired, the slot 26 can be sized to receive the edge of a coin for rotating the plug 22. As the knife 27 is rotated in a clockwise direction, as shown in FIG. 3, the point 29 is driven into the pouch 19, piercing and cutting or ripping the material to open the pouch so as to mix the refrigerant ingredients within the cavity 20.

In a cooling embodiment of the present invention, the two refrigerant ingredients provided can be any chemical compounds that, when mixed, will cause an endothermic, chemical reaction which significantly reduces the temperature of the solution causing a cooling effect on the beverage within the cavity 16 to chill the beverage prior to its being consumed. It has been found that ammonium nitrate ($NH_4NO_3$) and water ($H_2O$) is satisfactory to provide the desired results. In FIG. 2, the ammonium nitrate is contained within the pouch 19 and sufficient water is provided in the cavity 20. It is to be understood that, if desired, this arrangement can be reversed with the pouch 19 containing the water and the ammonium nitrate being provided to fill the cavity 20. In this embodiment, it may be desirable to enlarge the pouch 19 to substantially fill the cavity 20, since in instances a greater volume of water may be desirable to produce a sufficient endothermic chemical reaction to absorb the sensible heat present in the beverage to reduce its temperature, as desired.

The species of the invention has been described by reference to a cooling container for beverages, however, the invention is applicable to the heating of foods and beverages (e.g. coffee, tea, soup, hash, etc.) using ingredients that produce an exothermic reaction. Also, comestibles such as custard may be cooled, as well as beverages. Depending on the design, the pouch and/or the diaphragm may be attached to the container from either end, and in some instances may be attached to the same end, that is, the diaphragm and the pouch are attached between the same end closure and the container side wall.

While a self-contained beverage container has been shown and described in detail, it is obvious that this invention is not to be considered to be limited to the exact form disclosed in that changes in detail and construction may be made therein within the scope of the invention without departing from the spirit thereof.

What is claimed is:

1. A self-cooling or self-heating comestible container for storing such comestible and chilling or heating the same prior to dispensing, the container comprising
   a. an enclosed, rigid, hollow shell means having opposed first and second end walls and an intermediate side wall;
   b. a comestible receptacle means arranged within the shell means and communicating with said first end wall whereby comestible can be stored therein, said receptacle means arranged to occupy a predetermined volume of said shell means;
   c. comestible cooling or heating means provided within the said shell means and partially surrounding said comestible receptacle, said cooling or heating means comprising:
      1. two chemical ingredients which are stored separately and when mixed together, produce a thermal reaction which cools or heats the comestible stored within said comestible receptacle means;
      2. one of said ingredients being sealed within a pouch attached adjacent to said second end wall;
      3. the remaining ingredient arranged to surround said pouch and comestible receptacle and fill the remainder of said shell volume; and
      4. rupturing means mounted on said second wall whereby action of said rupturing means causes the opening of said pouch to mix the ingredients to cause said thermal reaction and
   d. said rupturing means includes a plug rotatably mounted in an opening provided in said second end wall, said plug includes knife means having one end depending therefrom and arranged in position outwardly from the longitudinal axis of said plug, said knife having means provided at its outer end whereby as said plug is rotated, said outer means will move so as to rupture said pouch to permit mixing of the thermal ingredients.

2. A self-cooling or self-heating comestible container as defined in claim 1, wherein:

said shell means is arranged in a cylindrical configuration with said first and second opposed end walls having a flat, circular arrangement and said side wall formed as a hollow tube.

3. A self-cooling or self-heating comestible container as defined in claim 1 wherein:

the comestible receptacle means is formed from an elongated, flexible membrane closed at one end and open at the opposite end, the edges of the open end being sealed along the edges of said first end wall so as to seal the comestible within a cavity defined by said membrane and said first end wall.

4. A self-cooling or self-heating comestible container as defined in claim 3 wherein:

said flexible membrane is arranged so that it is spaced inwardly from the inside surface of said side wall so that the mixed, thermal ingredients can circulate around a major portion of the beverage receptacle so as to efficiently cool or heat the comestible.

5. A self-cooling or self-heating comestible container as defined in claim 1 wherein:

the pouch of said thermal means is formed from a thin, frangible material.

6. A self-cooling or self-heating comestible container as defined in claim 1 wherein:

the outer surface of said plug exposed through said second end wall includes a rotating means, said rotating means being a slot arranged to accept a thin object for the purpose of rotating said plug.

7. A self-cooling or self-heating comestible container as defined in claim 1 wherein:

said container is for a beverage, and said comestible thermal ingredients are ammonium nitrate and water for cooling said beverage when said ingredients are mixed.

8. A self-cooling or self-heating comestible container as defined in claim 1 wherein:

said first wall includes an opening means which communicates with said comestible receptacle whereby said first wall can be at least partially opened to dispense the comestible contained within said receptacle.

9. A self-cooling or self-heating comestible container as defined in claim 8 wherein:

said opening means includes a continuously scored line defining an aperture and a handle means attached to the surface within said scored line whereby said handle may be rotated so as to tear the material of said first wall along said scored line to form a dispensing opening in said first wall.

10. A self-cooling or self-heating comestible container as defined in claim 1 wherein:

said comestible receptacle means is an elongated cup-shaped membrane closed at one end and open at the opposite end with the edge of the open end being sealed to one end of said shell, and said pouch being sealed to one end of said shell.

11. A self-cooling or self-heating comestible container as defined in claim 10 wherein both said membrane and said pouch are sealed to the same end of said shell.

* * * * *